United States Patent [19]

Kaufman et al.

[11] Patent Number: 5,594,842
[45] Date of Patent: Jan. 14, 1997

[54] APPARATUS AND METHOD FOR REAL-TIME VOLUME VISUALIZATION

[75] Inventors: Arie E. Kaufman, Plainview; Hanspeter Pfister, Stony Brook, both of N.Y.

[73] Assignee: The Research Foundation of State University of New York, Albany, N.Y.

[21] Appl. No.: 301,205

[22] Filed: Sep. 6, 1994

[51] Int. Cl.$^6$ .................................................. G06T 17/00
[52] U.S. Cl. ............................................ 395/124; 395/502
[58] Field of Search ................................. 395/124, 163, 395/166

[56] References Cited

U.S. PATENT DOCUMENTS

| | | | |
|---|---|---|---|
| 4,827,413 | 5/1989 | Baldwin et al. | 364/413.19 |
| 4,835,712 | 5/1989 | Drebin et al. | 395/123 |
| 4,984,157 | 1/1991 | Cline et al. | 364/413.13 |
| 4,985,856 | 1/1991 | Kaufman et al. | 395/124 |
| 5,038,302 | 8/1991 | Kaufman | 395/124 |
| 5,101,475 | 3/1992 | Kaufman et al. | 395/124 |
| 5,313,567 | 5/1994 | Civanlar et al. | 395/124 |
| 5,361,385 | 11/1994 | Bakalash | 395/124 |

OTHER PUBLICATIONS

Kaufman et al, "A Survey of Architectures for Volume rendering," IEEE Engineering in Medicine and Biology Magazine, pp. 18–23, Dec. 90.

Foley et al, "Computer Graphics: Principles and Practice, 2nd Edition" pp. 738, 835–842, 914, 1034–1039, 1990.

*Primary Examiner*—Mark K. Zimmerman
*Attorney, Agent, or Firm*—Hoffmann & Baron

[57] ABSTRACT

A method and apparatus for providing real-time processing of voxels and real-time volume visualization of objects and scenes in a highly parallel and pipelined manner using a three dimensional (3-D) skewed memory, a modular fast bus, two dimensional (2-D) skewed buffers, 3-D interpolation and shading of data points, and a ray projection cone. The method and apparatus permit investigation and viewing of real-time static (3-D) and dynamic (4-D) high resolution volumetric data sets such as those found in medical imaging, biology, non-destructive quality assurance, scientific visualization, computer aided design (CAD), flight simulation, realistic graphics and the like. The method and apparatus implement ray-casting, a powerful volume rendering technique. Viewing rays are cast from the viewing position into a cubic frame buffer. At evenly spaced sample points along each viewing ray, the data is tri-linearly interpolated using values of surrounding voxels. Central differences of voxels around the sample points yield a gradient which is used as a surface normal approximation. Using the gradient and the interpolated sample values, a local shading model is applied and a sample opacity is assigned. Finally, ray samples along the ray are composited into pixel values and provided to a display device to produce an image.

34 Claims, 10 Drawing Sheets

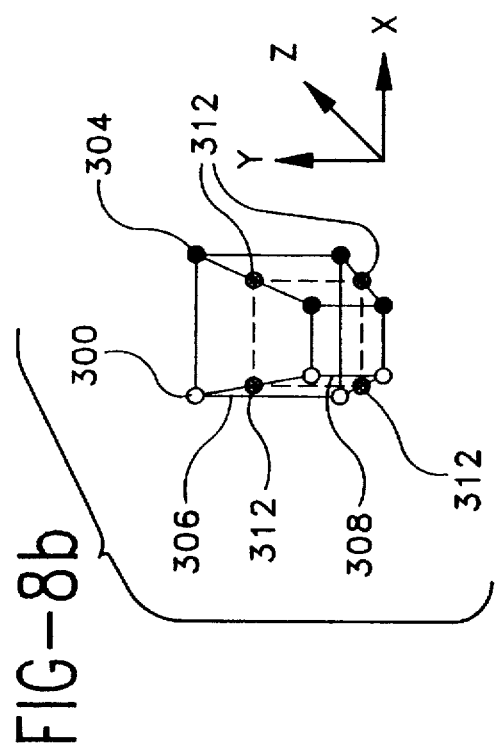
FIG-8b
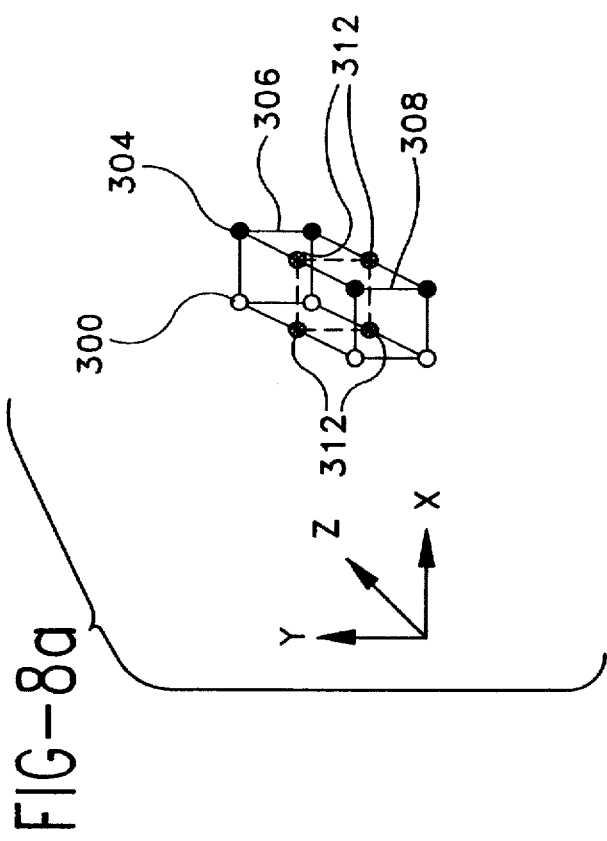
FIG-8a
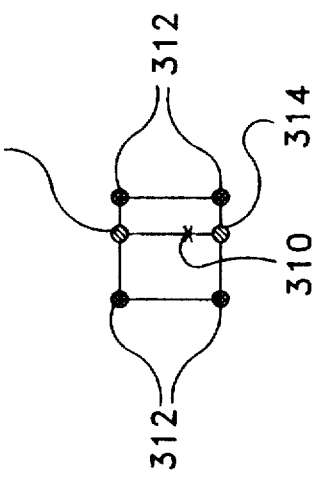
FIG-8d
FIG-8c

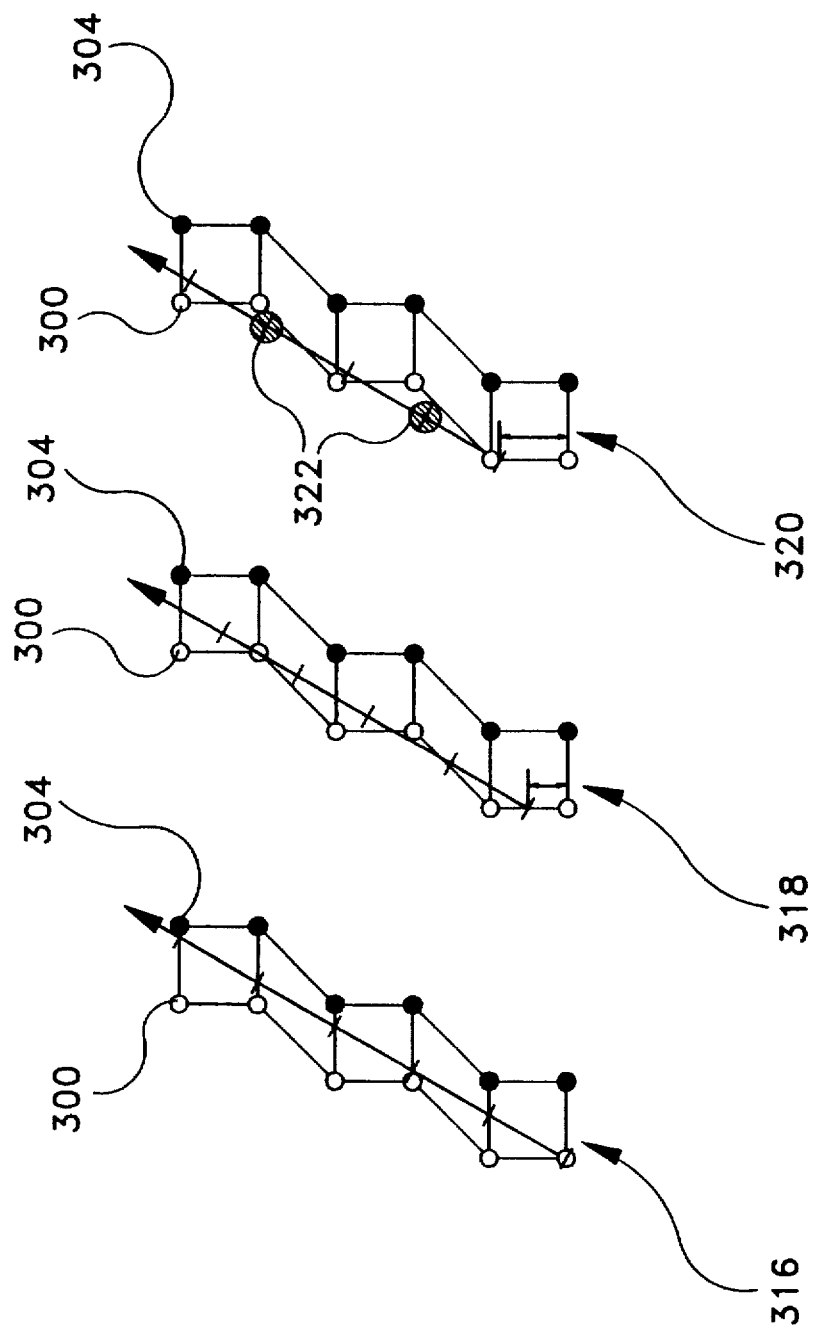

APPARATUS AND METHOD FOR REAL-TIME VOLUME VISUALIZATION

BACKGROUND OF THE INVENTION

The present invention relates to three dimensional (3-D) graphics and volumetric imaging, and more particularly to an apparatus and method for real-time parallel and perspective projection of high resolution volumetric images.

Image rendering is the process of converting complex information to a format which is amendable to human understanding while maintaining the integrity and accuracy of the information. Volumetric data, which consists of information relating to three-dimensional phenomena, is one species of complex information that can benefit from improved image rendering techniques. The process of analyzing volumetric data to determine, from a given viewpoint, which portions of a volume are to be presented is commonly referred to as volume visualization. Traditional methods of volume visualization operate by scanning through data points in a sequential manner in order to provide an accurate representation of an object. The need to model objects in real-time and the advantage of doing so using computer graphic systems is clear.

Special purpose computer architectures and methods for volume visualization are known. Referring now to FIG. 1, a volume visualization system 1 is shown. The volume visualization system 1 includes a cubic frame buffer 2 having a skewed memory organization which enables conflict free access of a beam of voxels in any orthographic direction, a two-dimensional (2-D) skewed buffer 4, a ray projection tree 6, and two conveyers 8, 10. The conveyors are commonly referred to as barrel shifters. A first conveyor 8 is coupled between the cubic frame buffer and the two dimensional skewed buffer, while a second conveyor 10 is coupled between the two-dimensional skewed buffer and the ray projection tree. This volume visualization system is capable of providing parallel projection in $O(n^2 \log n)$ time, where n is the measurement of one axis of the cubic frame buffer.

The operation and interrelationship of the cubic frame buffer 2 and the 2-D skewed buffer are shown in FIG. 2. The traditional volume visualization system 1 operates by casting viewing rays 12, originating at a pixel in a projection plane (not shown), through the cubic frame buffer 2 along a selected viewing direction. The viewing rays access a plurality of voxels 14 (defining a projection ray plane (PRP) 16) stored in the cubic frame buffer. The voxels defining the PRP are simultaneously retrieved by orthogonal beams 18 and provided to the conveyor 8.

The conveyor 8 provides a 2-D shearing of the voxels of the orthogonal beams which define the PRP. This 2-D shearing serves to align all of the voxels of each discrete viewing ray along a direction parallel to a 2-D axis of the 2-D skewed buffer to provided skewed viewing rays. Once the viewing rays are aligned in the 2-D skewed buffer, the skewed viewing rays can be retrieved and processed by the ray projection tree 6.

Before the ray projection tree 6 receives the skewed viewing rays, the accessed skewed viewing rays are provided to conveyor 10. The conveyor 10 preforms a deskewing operation in order to match the physical sequential order of the input modules of the ray projection tree 6 to the sequential order of the voxels of each viewing ray. Specifically, each viewing ray is shifted such that the first voxel in each projection ray appears at the corresponding first input position of the ray projection tree. The voxels of each ray are then processed by the ray projection tree in parallel so as to generate a pixel value associated with that projection ray.

The above-disclosed volume visualization system has substantial shortcomings and drawbacks. First, the speed at which the system operates is limited by the system architecture which provides arbitrary parallel and orthographic projections in $O(n^2 \log n)$ time. Secondly, the ray projection tree requires that each projection ray be provided thereto in a specific orientation. This requires a conveyor between the two-dimensional skewed buffer and the ray projection tree which adds to the overall hardware required by the system and the time needed for volume visualization. Thirdly, the traditional system provides only surface approximations of discrete projection rays by utilizing the closest non-transparent discrete voxel to points along the discrete projection rays instead of actual values along the continuous projection rays. This provides a somewhat inaccurate representation of the object. Fourthly, the conveyors are not readily capable of shifting data in a manner required for perspective projection (fanning and defanning of data) and real-time visualization of four-dimensional (4-D) data.

It is therefore an object of the present invention to provide a method and apparatus which operate faster than existing volume visualization systems.

It is also an object of the present invention to provide a method and apparatus which is more efficient than existing volume visualization systems.

It is a further object of the present invention to provide a method and apparatus which provide better resolution and a more accurate representation of objects than existing volume visualization systems.

It is another object to the present invention to provide a method and apparatus which are readily capable of supporting perspective projection and real-time visualization of four-dimensional (4-D) data.

It is yet another object of the present invention to provide a method and apparatus which overcome the inherent disadvantages of known volume visualization systems.

Other and further objects will be made known to the artisan as a result of the present disclosure, and it is intended to include all such objects which are realized as a result of the disclosed invention.

SUMMARY OF THE INVENTION

In accordance with one form of the present invention, apparatus for generating a three-dimensional (3-D) volume projection image of an object from a desired viewing direction includes at least two two-dimensional (2-D) memories capable of storing voxels therein. The apparatus also includes an interpolation mechanism coupled to the at least two 2-D memories. The interpolation mechanism generates a plurality of continuous rays including a plurality of substantially evenly spaced sample points along each of the plurality of continuous rays. The interpolation mechanism also utilizes aligned discrete rays of voxels stored by the at least two 2-D memories. Thereafter, the interpolation mechanism generates a plurality of interpolated sample signals for each of the plurality of sample points of the continuous rays in accordance with the voxels of the aligned discrete rays. Each of the plurality of interpolated sample signals corresponds to one of a plurality of continuous ray sample points.

The apparatus also includes a projection mechanism coupled to the interpolation mechanism. The projection mechanism combines the plurality of interpolated sample points and generates a pixel value signal for each continuous ray of the plurality of continuous rays. Each pixel value signal corresponds to a pixel of the 3-D volume projection image.

The apparatus may further include a 3-D memory having a skewed organization that permits the simultaneous retrieval of a plurality of voxels representing a voxel beam. The apparatus includes an interconnection mechanism frequently referred to as a fast bus, coupled between the 3-D memory and the at least two 2-D memories. The interconnection mechanism receives a plurality of voxels from the 3-D memory and reorients the plurality of voxels to provide aligned discrete rays of voxels according to an arbitrary projection, including parallel or perspective. The interconnection mechanism provides the aligned discrete rays of voxels to the at least two 2-D memories for storage therein. By aligning the voxel beams in this manner, all information associated with a discrete ray can be simultaneously retrieved in a conflict-free manner.

In accordance with the one form of the present invention, the interpolation mechanism is a tri-linear interpolation device, wherein the plurality of voxels received by the interpolation mechanism defines at least four discrete rays. The interpolation mechanism utilizes at least two voxels from each of the at least four discrete rays to generate an interpolated sample value signal for each continuous ray sample point.

In accordance with another form of the present invention, the projection mechanism has a plurality of input ports for receiving the plurality of interpolated sample signals from the interpolation means. The projection mechanism is arranged such that a first interpolated sample signal can be provided to any input port and the remaining successive interpolation sample signals will be provided to the remaining projection mechanism input ports in a wrap-around fashion. The projection mechanism includes a plurality of voxel combination stages wherein each includes a plurality of voxel combination units (VCU) each having an input port and an output port. The projection mechanism is configured such that successive voxel combination stages are interconnected and wherein each successive voxel combination stage includes decreasing numbers of VCU. Based upon a desired display, the projection mechanism will combine the interpolated sample signals in the requested manner to provide pixel value signals. The pixel value signals are provided to a frame buffer which stores the signals. The pixel value signals are thereafter provided to a pixel processing mechanism which performs a transformation of each pixel value signal to provide a plurality of pixel display signals. The pixel display signals are provided to, and processed by a frame buffer, pixel processor, and a display mechanism which generates the 3-D volume projection image.

In accordance with another form of the present invention, the apparatus may further include a shading mechanism which generates a gradient vector signal for each of the plurality of continuous ray sample points. The shading mechanism combines voxels proximate to each of the plurality of continuous ray sample points to provide a signal (called a gradient vector-signal) which is indicative of surface inclination proximate each continuous ray sample point.

In another embodiment of the present invention, the method for generating a three-dimensional (3-D) volume projection image of an object from a desired viewing direction includes selecting viewing parameters so as to access voxels stored in a cubic memory in a specific manner.

Included among the viewing parameters are the viewing direction, the screen plane position and orientation upon which the image is to be projected, and the type of voxel compositing. The method further includes generating a plurality of discrete rays within the cubic memory based upon the viewing parameters so as to access specific voxels. The plurality of discrete rays defines a plurality of discrete ray planes which are made of a plurality of voxels.

The method includes generating a plurality of continuous rays each having a plurality of continuous ray sample points and determining an interpolated voxel signal for each of the plurality of continuous ray sample points. The interpolated voxel signals are generated based upon signals associated with the voxels of discrete ray planes proximate to each continuous ray. Specifically, at least four discrete rays proximate to the continuous ray are selected and sample points along the continuous ray are chosen. Based upon the at least four discrete rays, at least one voxel along the four discrete rays proximate to the continuous ray sample point is selected. Thereafter, a linear interpolation is performed in order to determine a voxel signal for the sample point along the continuous ray. Then, the interpolated voxel signals for each sample point along the continuous ray are respectively combined to generate a pixel signal. The pixel signal may then be transformed in accordance with selected viewing parameters to provide a transformed pixel signal. The transformed pixel signal corresponds to one pixel of the 3-D volume projection image and defines characteristics of the pixel including color, translucency and contour. Thereafter, the transformed pixel signal associated with each continuous ray is displayed by a corresponding pixel of a display device.

In another form of the present invention, the method may also include determining a gradient vector signal and a normalized gradient vector signal for each continuous ray sample point. The gradient vector signal is determined by selecting at least four continuous rays proximate to a first sample point on a first continuous ray and second and third sample points along the first continuous ray for each of the at least four continuous rays. A sample point along each proximate continuous ray is selected which defines an intersection between a plane which is normal to the first continuous ray at the first sample point and one of the at least four proximate continuous rays. A corresponding voxel signal is determined for each of the second and third sample points of each continuous ray. The voxel signals are combined to provide an indication of surface inclination at the first sample point.

The apparatus and method of the present invention surpasses existing 3-D voxel based graphics methods and architectures in terms of performance, simplicity, image quality, expendability and ease of hardware realization so as to provide real-time high resolution parallel and perspective volume viewing from an arbitrary direction.

A preferred form of the apparatus and method for real-time volume visualization, as well as other embodiments, objects, features and advantages of this invention, will be apparent from the following detailed description of illustrative embodiments thereof, which is to be read in connection with the accompany drawings.

BRIEF DESCRIPTION OF THE DRAWINGS

FIG. 8A is a diagram of the method of interpolation for a parallel projection;

FIG. 8B is a diagram of the method of interpolation for perspective projection;

FIG. 8C is a diagram of the method of interpolation for a parallel projection;

FIG. 8D is a diagram of the method of interpolation for a perspective projection;

FIG. 9 is a diagram of a modified method for interpolation in accordance with the present invention;

DETAILED DESCRIPTION OF THE PREFERRED EMBODIMENTS

The method and apparatus of the present invention are capable of manipulating data and supporting real-time visualization of high resolution voxel-based data sets. The method and apparatus are designed for use as a voxel-based system as described in the issued patents and pending applications of Arie Kaufman, a named inventor of this application, including "Method Of Converting Continuous Three-Dimensional Geometrical Representations Into Discrete Three-Dimensional Voxel-Based Representations Within A Three-Dimensional Voxel-Based System", which issued an Aug. 6, 1991, as U.S. Pat. No. 5,038,302; "Method Of Converting Continuous Three-Dimensional Geometrical Representations Of Polygonal Objects Into Discrete Three-Dimensional Voxel-Based Representations Thereof Within a Three-Dimensional Voxel-Based System", which issued on Jan. 22, 1991, as U.S. Pat. No. 4,987,554; "Method And Apparatus For Storing, Accessing, And Processing Voxel-Based Data", which issued on Jan. 15, 1991, as U.S. Pat. No. 4,985,856; "Method Of Converting Continuous Three-Dimensional Geometrical Representations of Quadratic Objects Into Discrete Three-Dimensional Voxel-Based Representations Thereof Within A Three-Dimensional Voxel-Based System", which was filed on May 4, 1989, as Ser. No. 07/347,593, which was abandoned in favor of U.S. Ser. No. 08/031,599, filed on Mar. 15, 1993 as a continuation application of the '593 application; "Method And Apparatus For Generating Arbitrary Projections Of Three-Dimensional Voxel-Based Data", which issued on Mar. 31, 1992 as U.S. Pat. No. 5,101,475; "Method And Apparatus For Real-Time Volume Rendering From An Arbitrary Viewing Direction", which was filed on Jul. 26, 1993, as U.S. Ser. No. 08/097, 637; and "Method And Apparatus For Generating Realistic Images Using A Discrete Representation", which was filed on Mar. 20, 1992, as U.S. Ser. No. 07/855,223, the entire disclosure of each of these references is incorporated herein by reference.

Figure 1:
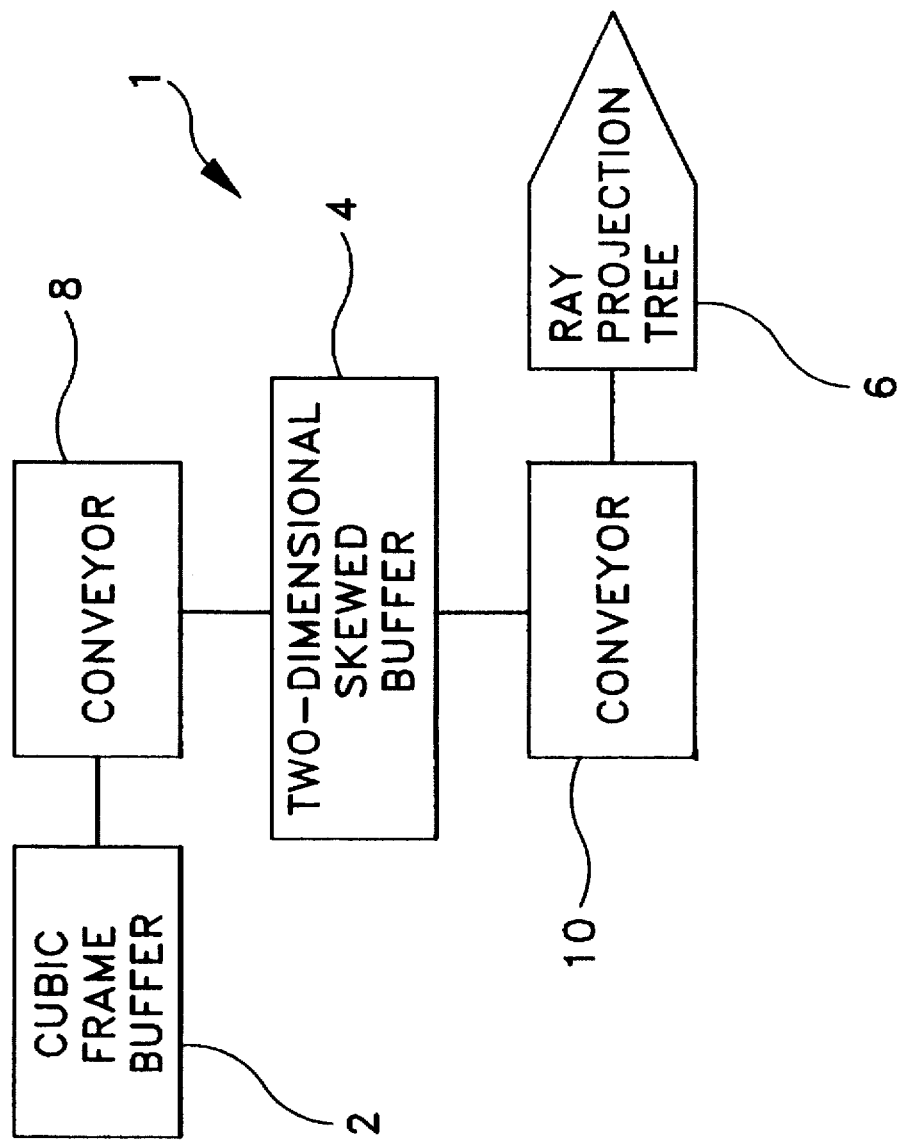
FIG. 1 is a block diagram of a traditional volume visualization system.
Figure 2:
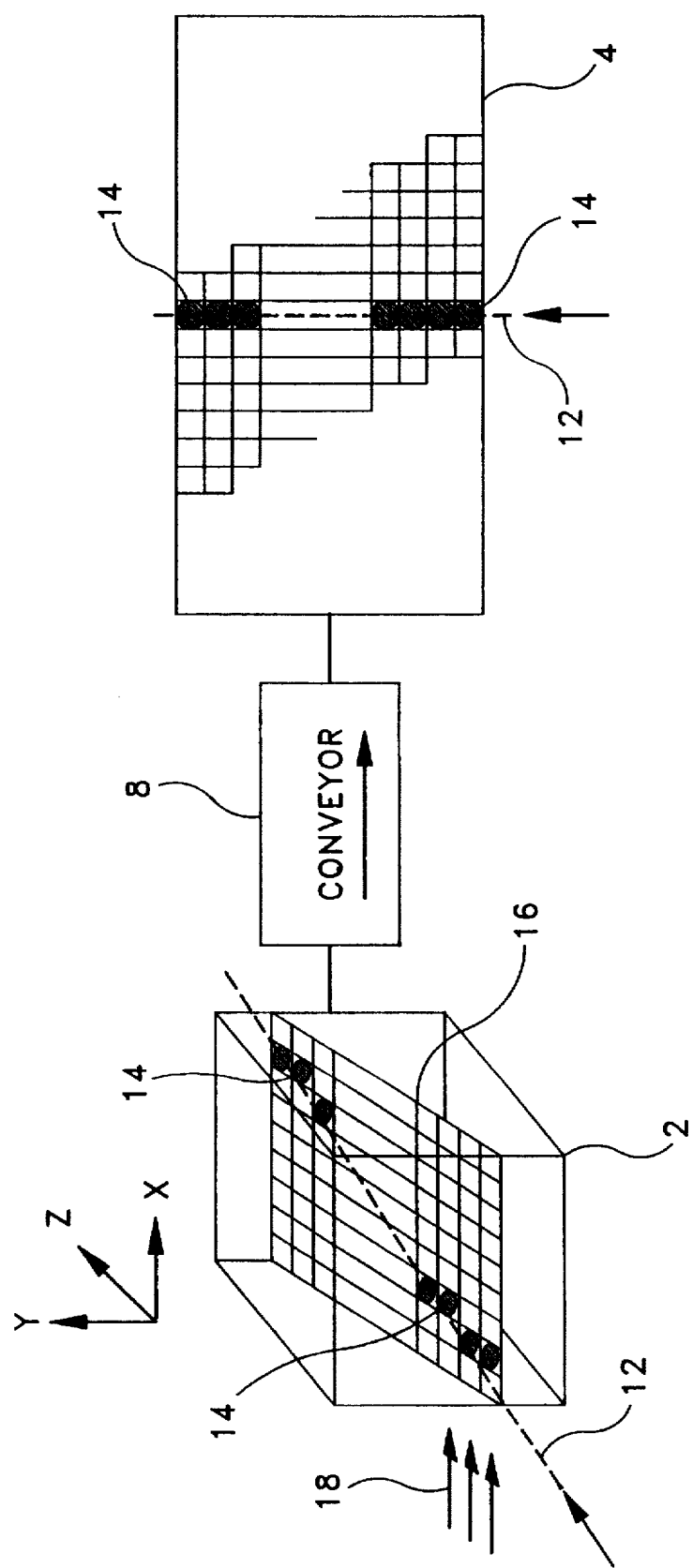
FIG. 2 is a representation showing the inter-relationship of a cubic frame buffer, viewing rays, orthogonal beams, projection ray planes and the two-dimensional skewed buffers of the traditional volume visualization system.
Figure 3:
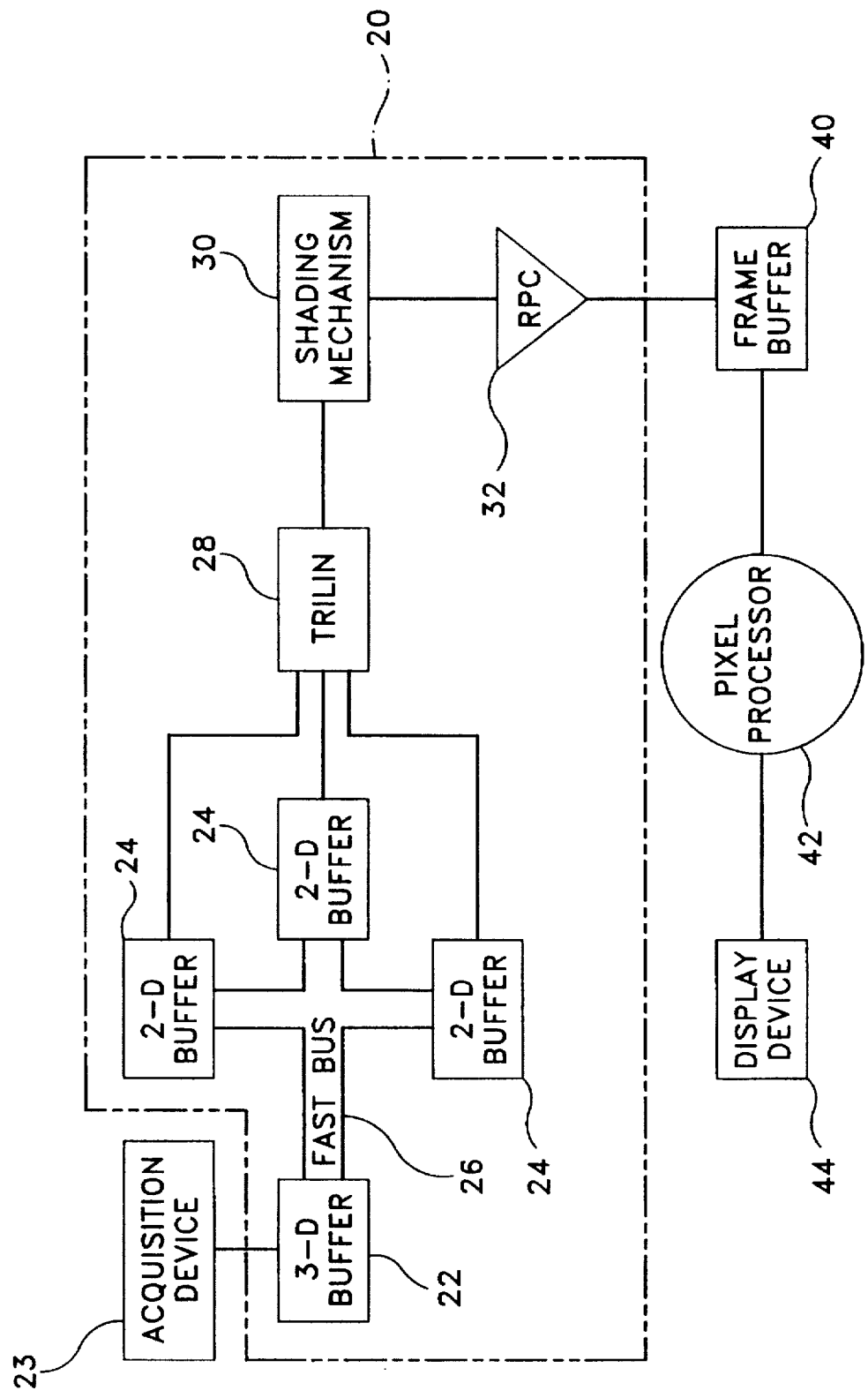
FIG. 3 is a functional block diagram of the apparatus for providing a 3-D volume projection of an object from a desired viewing direction constructed in a accordance with the present invention.

Referring now to FIG. 3, the apparatus of the present invention 20 preferably includes six basic components. These include a cubic frame buffer 22 having a plurality of memory storage units capable of storing voxels therein, three two-dimensional (2-D) buffers 24 and an interconnection mechanism 26 coupling the cubic frame buffer to each of the 2-D buffers. The cubic frame buffer is a three-dimensional (3-D) memory organized in n memory modules (or memory slices), wherein each memory module has $n^2$ memory storage units as described in the above-identified references. The cubic frame buffer also includes an independent dual access and addressing unit (not shown in the figures). A 3-D skewed memory organization, as described in the above-identified references, enables conflict-free access of any beam (i.e., a ray parallel to a main axis of the cubic frame buffer). The apparatus also includes an interpolation mechanism 28, shading mechanism 30 and projection mechanism 32.

The addressing unit of the cubic frame buffer 22 maps voxels in specific memory locations of the cubic frame buffer so as to provide conflict-free access of beams of voxels. Specifically, a voxel with space coordinates (x,y,z) is mapped onto the k-$^{th}$ memory module by:

$$k=(x+y+z) \bmod n$$

$$0 \leq k,x,y,z \leq n-1$$

Since beams of voxels are accessed such that two coordinates are always constant, the third coordinate guarantees that only one voxel from a corresponding beam resides in any one of the memory modules.

Each of the 2-D buffers 24 of the present invention are 2-D voxel storage devices having $2n^2$-n memory storage units. The cubic frame buffer 22 is coupled to the 2-D buffers 24 by the interconnection mechanism 26. The interconnection mechanism, hereinafter referred to as the "fast bus", is an interconnection network that supports the high-bandwidth transfer of data (beams of voxels) from the cubic frame buffer to the 2-D buffer. The fast bus manipulates the beams of voxels including skewing, de-skewing, fanning and de-fanning the voxel beams in order to support both parallel and perspective projection. In a preferred embodiment, the fast bus employs multiplexers and transceivers with associated control units and a multi-channel bus to accomplish the data transfer speeds-required for real-time volume visualization.

The voxels utilized in the volume visualization apparatus can be provided by a data acquisition device 23 (such as a scanner or M.R.I. device) or other mechanisms as known in the art.

Figure 4:
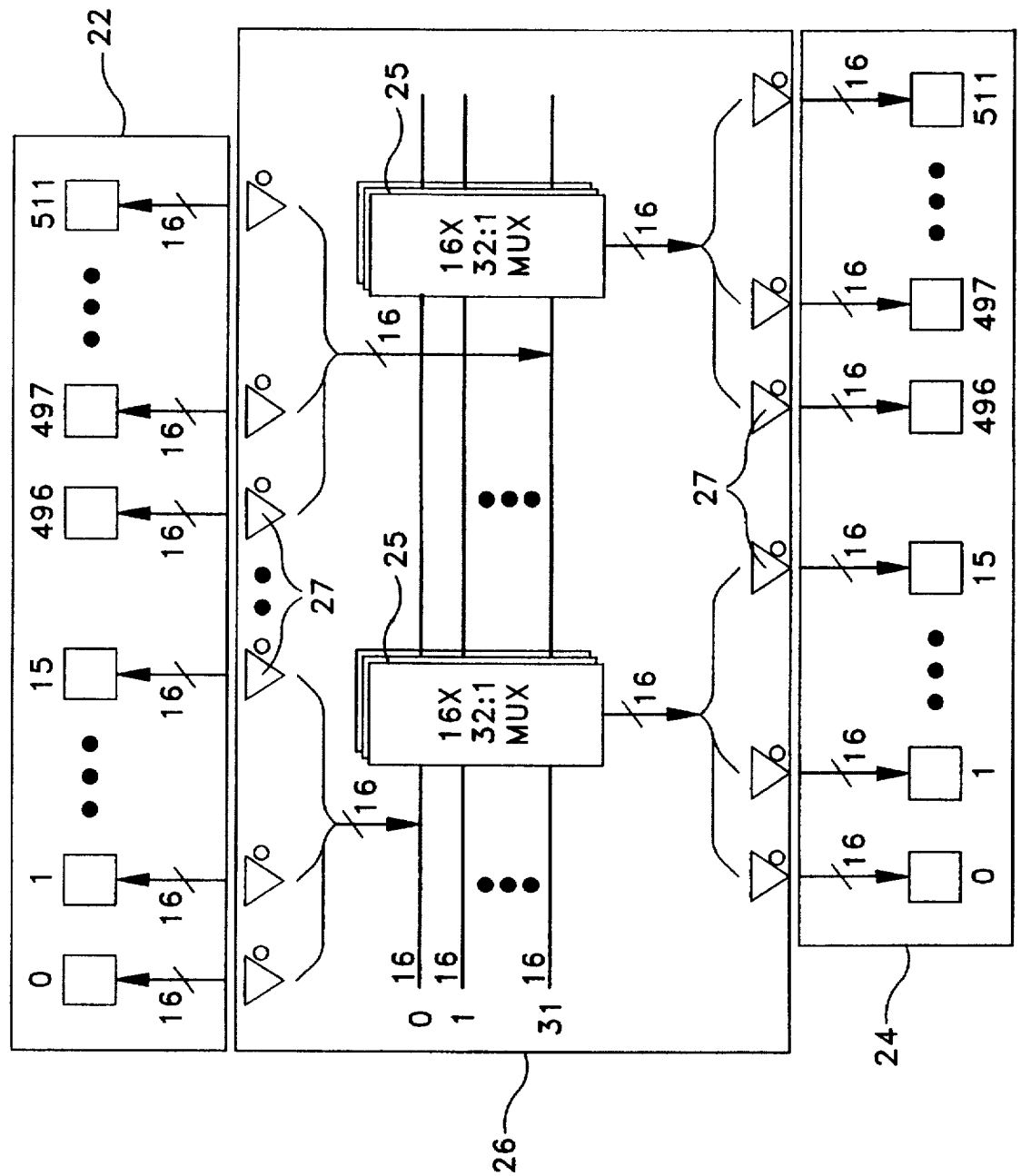
FIG. 4 is a functional block diagram of an interconnection mechanism which couples a cubic frame buffer and a two dimensional buffer.

Referring now to FIG. 4, a preferred form of the fast bus configuration is shown for a cubic frame buffer 22 having n=512 and a fast bus having 32 bus channels. As shown in the figure, the 512 memory modules of the cubic frame buffer are divided into 32 groups having 16 memory modules in each group. As a result, memory modules 0–15 transfer voxel information on channel 0 of the fast bus, memory modules 16–31 transfer voxel information on channel 1 of the fast bus and so on such that memory modules 496–511 transfer voxel information on channel 31 of the fast bus.

As previously stated, the fast bus includes a plurality of multiplexers 25 such that the voxel data from the memory modules (0–511) of the cubic frame buffer 22 are time-multiplexed onto a designated 16-bit fast bus channel for that group of memory modules. Table 1 shows the memory module data time-multiplexed on the fast bus. The signal multiplexing is achieved by utilizing a clock input with transceivers 27 associated with each memory module.

TABLE 1

| Channel | Time Slice | | | | |
|---|---|---|---|---|---|
| | 00 | 01 | ... | 14 | 15 |
| 00 | 000 | 001 | ... | 014 | 015 |
| 01 | 016 | 017 | ... | 030 | 032 |
| . | . | . | . | . | . |
| . | . | . | . | . | . |
| . | . | . | . | . | . |
| 30 | 480 | 481 | ... | 494 | 495 |
| 31 | 496 | 497 | ... | 510 | 511 |

As shown in FIG. 4, the 2-D buffers are divided into 32 groups wherein each group includes 16 memory modules. For each group of the memory modules of the 2-D buffer, voxel data from the 32 channels of the fast bus are provided into a respective memory module of the group of 16 memory modules.

The operation of the multiplexers 25 and transceivers 27 are controlled by a look-up table commonly referred to as the bus channel map. The bus channel map is pre-computed based upon selected viewing parameters (i.e., viewing direction, etc.). A change in the selected viewing parameters requires a re-computation of the look-up table. However, the limited size of the look-up table allows the re-computation to occur without affecting the real-time volume visualization and processing provided by the system.

Referring again to FIG. 3, the apparatus of the present invention 20 also preferably includes an interpolation mechanism 28 coupled to the 2-D buffers 24. In a preferred embodiment of the invention, the interpolation device is a tri-linear (TRILIN) interpolation mechanism which receives information about continuous viewing rays that are cast, preferably from the selected viewing position, through the cubic frame buffer 24. At evenly spaced locations along each viewing ray, sample points are indicated. The interpolation mechanism performs a tri-linear interpolation utilizing voxel data corresponding to pixel points proximate to each viewing ray sample point in order to determine interpolated voxel values for the sample points. These interpolated voxel values are used for providing a more accurate volume visualization image.

The apparatus of the present invention may also include a shading mechanism 30 coupled to the interpolation mechanism 28. Alternatively, the shading mechanism can be coupled directly to each of the 2-D buffers 24. In a preferred embodiment of the present invention, the shading mechanism receives viewing ray and sample point information from the interpolation mechanism. Thereafter, the shading mechanism receives the voxel data values proximate each viewing ray sample point. More specifically, the shading mechanism receives discrete voxel rays on the immediate left, right, above and below as well as the values of the viewing ray sample points proximate the current sample point. Based on the voxel information provided, a gradient vector for each sample point is determined by taking the differences of all voxel values proximate each sample point to provide an indication of the direction and amount of change in the characteristics of the object.

Figure 5B:
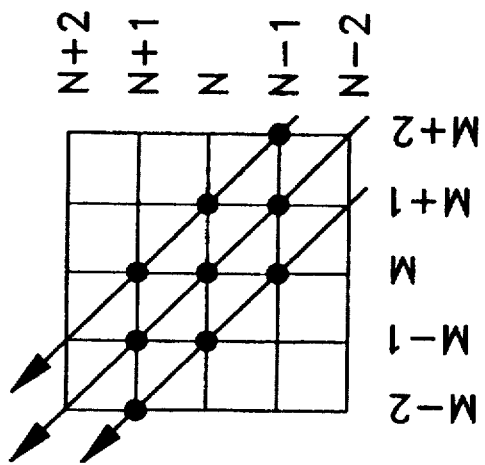
FIG. 5B is a graph of a 26-neighborhood gradient estimation method is accordance with the present invention.
Figure 5A:
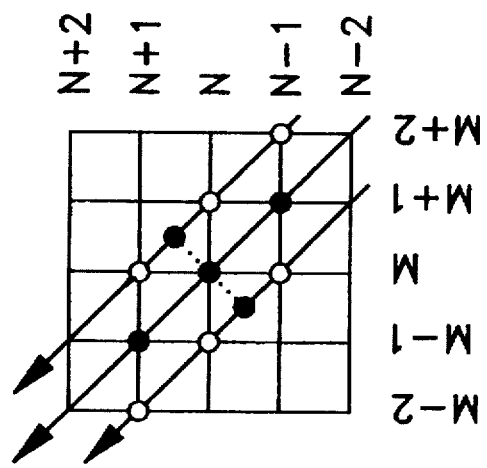
FIG. 5A is a graph of a 10-neighborhood gradient estimation method in accordance with the present invention.

FIGS. 5A and 5B illustrate two different gradient estimation schemes. The most simple approach (not shown) is the 6-neighborhood gradient. This method uses the difference of neighboring sample values along the continuous ray, $P(n, m+1)-P(n,m-1)$ in the x direction and $P(n+1,m+1)-P(n-1, m-1)$ in the y direction. Although the left, right, above and below ray samples are in the same plane and orthogonal to each other, the samples in the y direction of the ray are not. More importantly, when a change in the viewing direction causes a change in the major axis from m to n, the values of $P(n+1,m)-P(n-1,m)$ are used to calculate the gradient in the x direction. This leads to noticeable motion aliasing.

In a preferred form of the present invention as shown in FIG. 5A, the aliasing problem is circumvented by performing an additional linear interpolation. The additional step includes resampling the neighborhood rays at positions that are orthogonal (black samples) to the current sample point. This approach is commonly referred to as the 10-neighborhood gradient estimation, and it solves the problem of switching the major axis during object rotations.

Referring now to FIG. 5B, the use of a 26-neighborhood gradient will be described. Instead of fetching sample values from four neighboring rays, 26 interpolated samples from 8 neighboring rays are fetched and the gradient is estimated by taking weighted sums (i.e., the voxels closest to the sample point are given the greatest weight in determining the gradient) inside and differences between adjacent planes. This method leads to better over all image quality, but the switching of major axis is still noticeable, although less than with the 6-neighborhood gradient method.

In the case of perspective projections, the front of each projection ray plane (PRP) is uniformly sampled with n rays one unit apart. As the rays diverge towards the back of the cubic frame buffer volume, the distance between rays increases, and the averaged value, as previously explained, is utilized.

The shading mechanism preferably also includes a light vector lookup table. By knowing the gradient value and the values of the light vector look-up table, an intensity of each sample point can be generated using a variety of shading methods (e.g., using an integrated Phong Shader as known in the art). In order to display translucency at a sample point, opacity values are generated using a transfer function represented as a 2-D lookup table indexed by sample density.

Referring again to FIG. 3 and as mentioned previously, the present invention also preferably includes a projection mechanism (RPC) 32. The projection mechanism receives interpolated voxel values (corresponding to viewing ray sample points) from the interpolation mechanism 28, combines the interpolated voxel values in one of the variety of ways, and generates a pixel value for each viewing ray. The pixel value corresponds to the color, opacity and texture of the object or space being represented at a corresponding pixel location. Preferably, the projection mechanism is able to combine the interpolated voxel values with either back-to-front compositing, front-to-back compositing, first opaque projection, weighted sum projection, last-to-first cut projection or first-to-last cut projection (which provides a volume visualization of a cross section of an object or region having a specified thickness).

Figure 6:
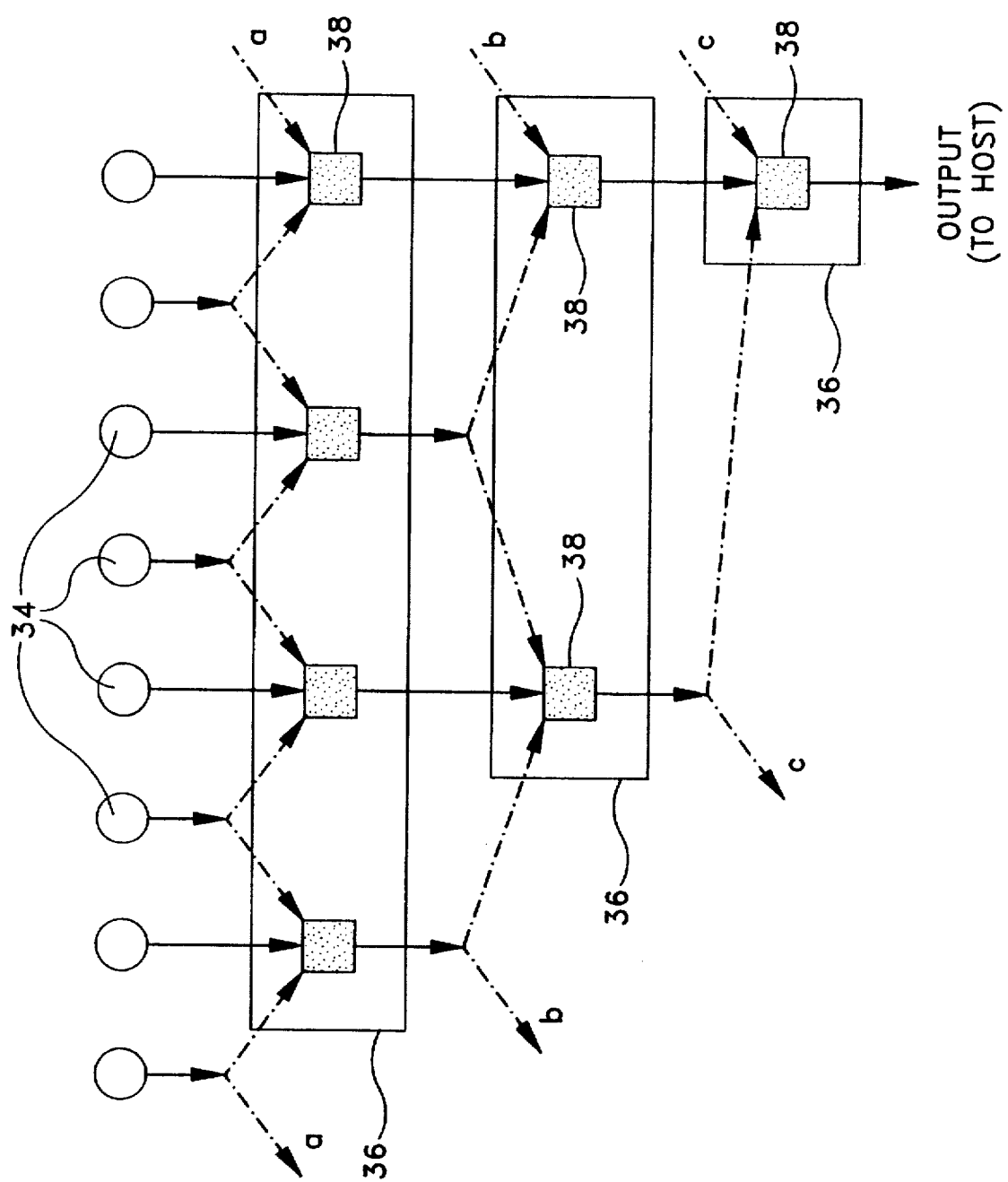
FIG. 6 is a functional block diagram of a projection mechanism constructed in accordance with the present invention.

In the preferred embodiment of the present invention, the projection mechanism is a ray projection cone (RPC) which generates one pixel value signal per clock cycle using a variety of projection schemes as described above. As shown in FIG. 6, the ray projection mechanism includes a plurality of input ports 34 for receiving the plurality of interpolated sample signals for each of the plurality of continuous viewing rays. Coupled to each of the plurality of input ports 34 are a plurality of voxel combination stages 36. Each voxel combination stage includes a plurality of voxel combination units (VCU) 38. As shown in FIG. 6, each successive voxel combination stage includes fewer VCU than the previous voxel combination stage. Each VCU is preferably coupled to three input ports 34. However, in the preferred embodiment, the RPC is designed to select only two interpolated sample signals from two of the three input ports or preceeding VCU's. Specifically each VCU selects as input the left and center or right and center connection for receiving input signals depending upon the selected viewing scheme.

As shown in FIG. 6, the RPC is a folded (circular) cross-linked binary tree with n leaves, which can be dynamically mapped onto a tree with its leftmost leaf at any arbitrary end-node of the RPC. This allows the processing of a viewing ray of voxels such that the first voxel of the ray can be provided to any input port of the RPC. This in turn allows the cone to be hardwired to the outputs of the 2-D buffers which contain the voxels. Such a configuration eliminates the need for a set of n, n-to-1 switching units or barrel shifters for de-skewing of the 2-D buffer data as was required by prior art ray projection mechanisms. In a preferred embodiment of the invention, the leaves of the cone contain the TRILIN and the shading mechanism.

Preferably, the RPC accepts as input a set of n interpolated sample signals along the viewing ray and produces a pixel value signal for the pixel corresponding to the associated viewing ray. As shown in FIG. 6, the cone is a hierarchical pipeline of n-1 primitive computation nodes VCU. At any given time frame, the cone is processing log n viewing rays simultaneously in a pipelined fashion, producing a new pixel value signal corresponding for one pixel of the display every clock cycle.

The opacity of each voxel may be pre-stored with every voxel or provided through a look-up table or a transfer function inside the shading mechanism at the leaves of the cone. In a preferred embodiment, the VCU produces an output signal by performing one of the following operations:

| First opaque: | if ($\alpha_L$ is opaque) | $V' = V_L$ |
| | else | $V' = V_R$ |
| Maximum value: | if ($C_L < C_R$) | $V' = V_R$ |
| | else | $V' = V_L$ |
| Weighted sum: | $C^1 = C_L + W_k C_R$ | | where W is the weighting factor and k is the cone level (i.e., the number of voxel combination stages). $W_k$ is pre-computed and pre-loaded into the VCU's. It should be mentioned that a weighted sum is useful for depth cueing, bright field, and x-ray projections. Compositing is determined by the following:

$$C' = C_L + (1-\alpha_L)C_R$$

$$\alpha' = \alpha_L + (1-\alpha_L)\alpha_R$$

where the first level VCU's compute $C_i = C_i \alpha_i$, assuming the values are gray-levels. This is actually a parallel implementation of the front-to-back (or back-to-front) compositing. The pixel value is transmitted, for example, to a general purpose host computer or a pixel processor 42, where post-processing, such as post-shading, splatting, and 2-D transformation or warping, is performed.

Referring again to FIG. 3, the apparatus of the present invention may also include a frame buffer 40, pixel processor 42 and display device 44 coupled to the projection mechanism. Preferably, the pixel value signal generated by the projection mechanism 32 is provided to the frame buffer 40 where each pixel value signal is stored, provided to the pixel processor 42 for 2-D transformation, filtering or warping, and thereafter provided to a display device 44 for visual display. The pixel processor 42, as is known in the art, transforms the pixel value signal so that it can be properly displayed on the display device.

Referring now to FIGS. 7-11, the interpolation mechanism 28 and the method of determining interpolated sample value signals will now be described. The interpolation mechanism 28 of the present invention generates a voxel value signal at non-voxel locations by utilizing the eight surrounding voxels and interpolating as follows:

$$P_{abc} = P_{000}(1-a)(1-b)(1-c) + P_{100}a(1-b)(1-c) +$$

$$P_{010}(1-a)b(1-c) + P_{001}(1-a)(1-b)c +$$

$$P_{101}a(1-b) + P_{011}(1-a)bc + P_{110}ab(1-c) + P_{111}abc.$$

The relative 3-D coordinate of a corresponding sample point within the cubic frame buffer with respect to a corner voxel closest to the origin is (a,b,c). The data values associated with the corner voxels of the cubic frame buffer are $P_{ijk}$, where i, j, k=0 or 1, and the interpolated data value associated with the sample point is $P_{abc}$. Different optimizations aim at reducing the arithmetic complexity of this method, but the arbitrary memory access to fetch eight neighboring voxels for each sample point makes this one of the most time consuming operations during volume rendering.

By transforming discrete rays of the PRP that are stored in the cubic frame buffer so that they are aligned, and storing them in two 2-D buffers as previously described, the data access time can be greatly reduced. Instead of fetching the eight-neighborhood of voxels of each resampling location, four discrete rays are fetched from the buffer, two from each of the projection ray planes (PRP) above and below the current ray. The projection ray planes are provided from the 2-D buffers. In parallel implementations of the interpolation method, neighboring rays reside in adjacent interpolation modules, requiring only a local shift operation of one voxel unit between neighbors.

Figure 7B:
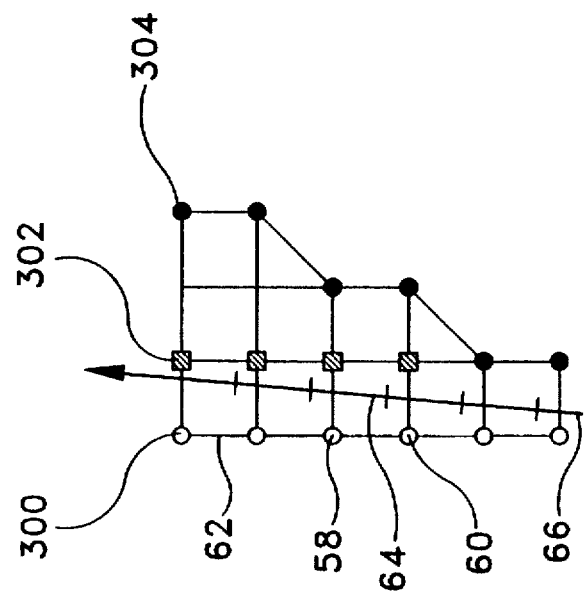
FIG. 7B is a graph of a second method of interpolation utilized in accordance with the present invention.
Figure 7A:
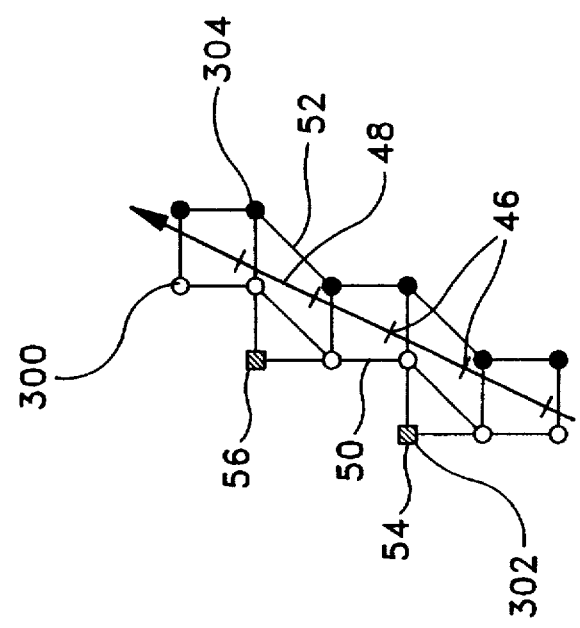
FIG. 7A is a graph of a first method of interpolation utilized in accordance with the present invention.

An interpolation method is shown in FIGS. 7A and 7B. Open circles 300 represent discrete ray A and black circles 304 represent discrete ray B. Shaded boxes 302 represent missing voxels. Referring to FIG. 7A, sample points 46 on the continuous ray 48 are interpolated using bi-linear interpolation between samples of proximate discrete rays 50 (white) and 52 (black). The first sample point of the continuous ray 48 can be correctly interpolated using four voxels from discrete rays 50, 52 since the four voxels form a rectangle (i.e., the rays do not make a discrete step to the left or right).

As soon as the discrete rays step to the left or right as is the case for the second and fourth samples along the continuous ray 48, the four adjacent voxels form a parallelogram, and a straightforward bi-linear interpolation might not provide accurate voxel sample values. Therefore, the grey shaded square voxels 54, 56 are required to yield a more accurate result. However, these voxels reside on discrete rays two units away from the continuous ray 48.

Referring now to FIG. 7B, the problem of not utilizing the best voxel point to provide an interpolated sample signal is shown for perspective projections. Since discrete rays diverge for perspective viewing, the correct neighboring voxels are not stored in the 2-D buffers. For example, only two voxels 58, 60 of discrete ray 62 contribute to the correct interpolation of the third sample point 64 of the continuous ray 66. In the 3-D case, as many as six voxels may be missing in the immediate neighborhood of sample point 64 for perspective projections.

The solution is to perform a sheared tri-linear interpolation by dividing the method into four linear and one bi-linear interpolation. Instead of specifying the sample location with respect to a corner voxel closest to the origin as was done with previous methods, each 3-D coordinate along the continuous ray consists of relative weights for linear interpolations along each axis in possible sheared voxel neighborhoods. These weights can be pre-computed and stored in templates.

Referring now to FIG. 8A–8D, the steps necessary for interpolation in 3-D are shown for both parallel projection (FIGS. 8A and 8C) and perspective projection (8B and 8D). Open circles 300 represent discrete ray A and black circles 304 represent discrete ray B. First, four linear interpolations are performed in the direction of the major axis (the Z-axis is the major direction of travel of the continuous ray) using eight voxels of four neighboring discrete rays stored the 2-D buffers. As shown in FIGS. 8A and 8B, these eight voxels are the vertices of an oblique parallelepiped for parallel projections or of a frustum of a pyramid for perspective projections. Four voxels each reside on two separate planes one unit apart, which are commonly called the front 308 or the back 306 plane depending on when it is encountered during ray traversal in the direction of the major axis. Therefore, only one weight factor has to be stored, corresponding to the distance between the front plane and the position of the ray sample point. The resulting four interpolated values (double-hatched circles 312) form a rectangle and can be bi-linearly interpolated to yield the final interpolated sampled value 310. This bi-linear interpolation is divided into two linear interpolations between the corner values (single-hatched circles 314) and the final linear interpolation between the edge values. In FIGS. 8C and 8D, this is shown as two interpolations in the X-direction followed by one interpolation in the Y-direction.

The sample points corresponding to the continuous rays are preferably inside the polyhedron defined by the voxels on the four surrounding discrete rays. When constructing the discrete rays, all continuous rays start at integer positions of the base plane (i.e., they coincide with voxels of the first slice of the volume dataset). As shown in FIG. 9, the use of these rays during ray casting effectively reduces the tri-linear interpolation to a bi-linear interpolation, because all sample points along the ray fall onto the front planes of the parallelepiped or pyramid frustum.

Referring now to FIG. 9 (no offset case 316), utilizing X and Y integer positions on the base-plane permits an offset (see offset in range case 318) from the base-plane in the major direction of ray transversal as a degree of freedom and enables sheared tri-linear interpolations. However, as shown in FIG. 9 (offset out of range case 320) for offsets in the major direction that are relatively large, some of the samples 322 along the ray may fall outside the bounding box defined by the discrete rays. Note that in FIG. 9, open circles 300 represent a discrete ray A and black circles 304 represent a discrete ray B.

Figure 10:
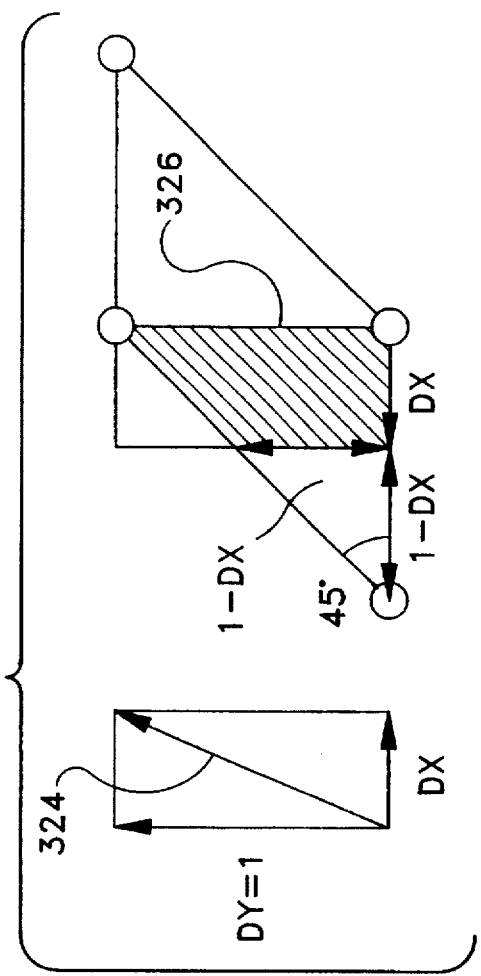
FIG. 10 is a diagram of the maximum offset estimation for use in a method of interpolation in accordance with the present invention.

Referring now to FIG. 10, a continuous viewing vector 324 is split into a dx component along the X-axis (dx and dy in 3-d) and a unit vector in direction of the major axis (the Y-axis). By stepping in the direction of the major axis, the viewing vector may be added to the current sample position in order to get the new sample position.

Suppose that the addition of dx at the current sample position leads to a step of the discrete rays in the x direction. This step can only occur if the current sample position has a relative x offset with respect to the lower left corner voxel of more than 1−dx for positive dx (or less than 1−dx for negative dx). In other words, the current sample position was inside the rectangle of side dx by 1 shown in FIG. 10. However, only the shaded region 326 of this rectangle contains sample positions inside the parallelepiped defined by the corner voxels. Taking the smallest side in the major axis as the worst-case, this means that in-range samples have maximal relative y offsets of no more than 1−dx for positive dx (no less than 1+dx for negative dx).

Since stepping is performed with a unit vector in the direction of the major axis, all relative offsets along the continuous ray are determined by the offsets of the first ray samples from the base-plane. The above argument easily extends to 3-D, making the maximum allowed offset in the direction of the major axis:

| | |
|---|---|
| min (1 − dx, 1 − dy), | dx, dy ≥ 0 |
| min (1 + dx, 1 − dy), | dx < 0, dy ≥ 0 |
| min (1 − dx, 1 + dy), | dx ≥ 0, dy < 0 |
| min (1 + dx, 1 + dy), | dx, dy < 0, | where dx and dy are the components of the viewing vector in the x and y directions, respectively. Notice that for 45° viewing angle, dx and dy are 1, yielding an offset of 0 and bi-linear interpolation as shown in FIG. 9.

In the preferred embodiment of the invention, a single ray is cast from the origin of the image plane onto the base-plane using uniform distance between samples and the offset is chosen in the major direction of the first sample after the ray penetration of the base-plane. If necessary, the offset is iteratively reduced until it satisfies the above condition. This leads to view dependent offsets in the major direction of travel and to varying resampling of the dataset. The variation of resampling points according to the viewing direction is an advantage for interactive visualization, because more of the internal data structure can be revealed.

Each discrete ray consists of n voxels, independent of the viewing direction. Since the maximum viewing angle difference with the major axis is not more than 45 degrees, the volume sample rate is defined by the diagonal through the cube and is by a factor of $\sqrt{3}$ higher for orthographic viewing. It has been found that for ray-compositing, this is not an important consideration due to the averaging nature of the compositing operator.

A more severe problem is the varying size of the sample neighborhood. For parallel projections, the eight voxels surrounding the sample point either form a cube with sides of length one or an oblique parallelepiped as shown in FIG. 8A. For perspective projections, however, the surrounding voxels may form the frustum of a pyramid with parallel front and back planes as in FIG. 8B. Due to the divergence of rays towards the back of the data set, the column spanned by this frustum increases, thereby reducing the precision of the tri-linear interpolation. However, it has been found that the distance between neighboring discrete rays at the end of the volume never exceeds two voxels for a $256^3$ dataset while still achieving a high amount of perspectively. Furthermore, in typical datasets, the samples at the back of the volume have little influence on the final pixel color due to compositing along the ray.

Figure 11:
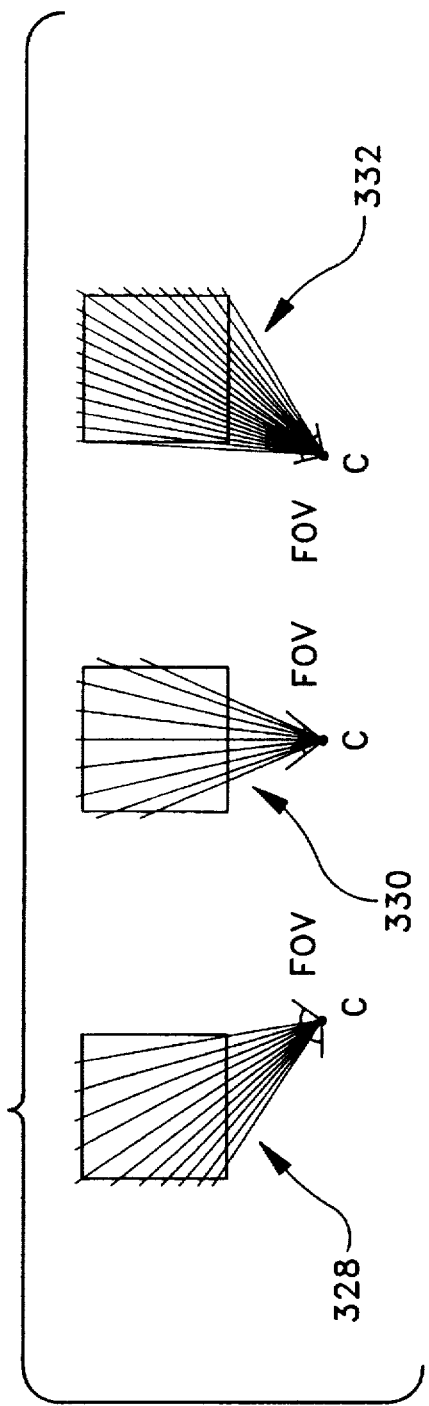
FIG. 11 is a diagram showing the sampling rates of the cubic frame buffer based upon difffering fields of view.

The center of projection (C) and the field-of view (FOV) in perspective projections also influence the sampling rate. The discrete line algorithm casts exactly one ray per pixel of the base-plane, or a maximum of 2n rays per scanline. Referring now to FIG. 11, in cases where the FOV extends across the dataset (correct sampling case 328), this guarantees better sampling than regular image order ray-casting which would cast n rays scanning the FOV and send wasteful rays that miss the dataset. However, for a small FOV the discrete line stepping yields undersampling (case 330) in the active regions of the base-plane. Case 332 of FIG. 11 shows a situation where two base-plane images contribute to the final view image. This is the worst case in the generation of three base-plane projections for a single perspective image.

As is evident from the above description, the apparatus and method of the present invention provides a more accurate representation of the object or scene being displayed due to the interpolation and shading included in the invention. In addition, since the present invention does not require conveyors or the like as used in prior art devices, the apparatus of the present invention operates more efficiently and faster than the prior art systems because the data manipulation is performed "on the fly" in a highly parallel manner. Specifically, the apparatus and method performs in $O(n^2)$ time as compared to the prior art system which performs in $O(n^2 \log n)$ time. In addition, since the interconnection mechanism is capable of performing both de-skewing for parallel projection and de-fanning for perspective projection (i.e., a form of data compression), the present invention is capable of supporting perspective projection and real-time visualization of four dimensional (4-D) data.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed:

1. A method for generating a three-dimensional (3-D) volume projection image having a plurality of pixels, the method utilizing discrete voxels stored in a cubic memory, each voxel having at least one voxel signal associated therewith, the method comprising:

a) selecting viewing parameters to access voxels stored in the cubic memory;

b) generating a plurality of discrete rays within the cubic memory based upon the viewing parameters, each of the plurality of discrete rays being composed of a plurality of voxels stored in the cubic memory, the plurality of discrete rays defining a plurality of discrete ray planes, each of the plurality of discrete ray planes being composed of a plurality of voxels;

c) generating a plurality of continuous rays and defining a plurality of continuous ray sample points along each of the continuous rays;

d) determining an interpolated voxel signal for each of the plurality of continuous ray sample points of each of the plurality of continuous rays utilizing signals associated with the voxels of each of at least two discrete ray planes proximate to each of said continuous rays, the interpolated voxel signals for each continuous ray sample point of a given one of the plurality of continuous rays being determined in parallel;

e) combining the interpolated voxel signals for each of the plurality of continuous ray sample points of each of the plurality of continuous rays to generate a plurality of pixel signals associated with corresponding pixels of the 3-D volume projection image, each of said plurality of pixel signals being obtained from combination of the interpolated voxel signals of a corresponding one of said plurality of continuous rays, the pixel signals defining characteristics of the corresponding pixels; and f) displaying the pixel associated with each of the plurality of continuous rays.

2. A method for generating a three-dimensional (3-D) volume projection image as defined by claim 1, the method further comprising:

determining a gradient vector signal for each of the plurality of first continuous ray sample points, the gradient vector providing an indication of surface inclination.

3. A method for generating a three-dimensional (3-D) volume projection image as defined by claim 2, the method further comprising:

normalizing the gradient vector signal for each of the plurality of first continuous ray sample points to provide a plurality of normalized gradient vector signals.

4. A method for generating a three-dimensional (3-D) volume projection image as defined by claim 3, the method further comprising:

combining each of the plurality of normalized gradient vector signals with a shading model signal to provide a shading signal for each of the plurality of first continuous ray sample points, the shading signal providing an indication of a 3-D realism of the object at a corresponding location.

5. A method for generating a three-dimensional (3-D) volume projection image as defined by claim 3, the method further comprising:

combining each of the plurality of normalized gradient vector signals with an opacity function signal to provide an opacity signal for each of the plurality of first continuous ray sample points, the opacity signal providing an indication of a translucent realism of the object at a corresponding location.

6. A method for generating a three dimensional (3-D) volume projection image as defined by claim 2, the method further comprising:

a) determining at least four continuous rays proximate to a first sample point of the first continuous ray;

b) determining at least second and third sample points of the first continuous ray proximate to the first sample point;

c) determining a sample point along each of the at least four continuous rays, each sample point being proximate to the first sample point of the first continuous ray; and d) combining the interpolated voxel signal associated with the at least second and third sample points of the first continuous ray and the voxel signal associated with the sample point of the at least four continuous rays.

7. A method for generating a three-dimensional (3-D) volume projection image as defined by claim 6 wherein each sample point of the at least four continuous rays defines an intersection between a plane which is normal to the first continuous ray at the first sample point and a corresponding ray of the at least four proximate continuous rays.

8. A method for generating a three-dimensional (3-D) volume projection image as defined by claim 2 the method further comprising:

subtracting a voxel signal associated with at least a first sample point from a voxel signal associated with at least a second sample point.

9. A method for generating a three-dimensional (3-D) volume projection image as defined by claim 8, the method further comprising:
   a) multiplying the voxel signal associated with the at least first sample point by a first weighting factor; and
   b) multiplying the voxel signal associated with the at least second sample point by a second weighting factor.

10. A method for generating a three-dimensional (3-D) volume projection image as defined by claim 1, the method further comprising:
   reorienting the plurality of voxels of each of the plurality of discrete rays to provide a plurality of aligned discrete rays, the plurality of aligned discrete rays providing a plurality of aligned discrete ray planes.

11. A method for generating a three-dimensional (3-D) volume projection image as defined in claim 10, the method further comprising:
   aligning voxels of each of the plurality of aligned discrete rays in a direction parallel to an axis of the aligned discrete ray planes.

12. A method for generating a three-dimensional (3-D) volume projection image as defined by claim 10, the method further comprising:
   storing the voxels of each of the plurality of aligned discrete rays in a skewed orientation.

13. A method for generating a three-dimensional (3-D) volume projection image as defined by claim 1, the method further comprising:
   a) determining at least first, second, third and fourth discrete rays proximate to the first continuous ray;
   b) determining a first sample point of the first continuous ray;
   c) determining at least one voxel along each of the at least first, second, third and fourth discrete rays, proximate to the first sample point of the first continuous ray; and
   d) utilizing the at least one voxel along each of the at least first, second, third and fourth discrete rays to interpolate a first sample point signal associated with the first sample point.

14. A method for generating a three-dimensional (3-D) volume projection image of an object from a desired viewing direction as defined by claim 13, the method further comprising:
   a) determining at least first and second voxels along each of the at least first, second, third and fourth discrete rays, the at least first and second voxels being proximate to the first sample point of the first continuous ray; and
   b) interpolating between the at least first and second voxels to obtain the first sample point voxel signal.

15. A method for generating a three-dimensional (3-D) volume projection image as defined by claim 14, wherein step (b) further comprises:
   a) performing a linear interpolation between the first and second voxel signals of each of the first, second, third and fourth discrete rays to provide first, second, third and fourth linearly interpolated sample signals;
   b) performing a linear interpolation between the first and second linearly interpolated samples to provide a first bi-linearly interpolated sample signal;
   c) performing a linear interpolation between the third and fourth linearly interpolated samples to provide a second bi-linearly interpolated sample signal;
   d) performing a linear interpolation between the first bi-linear interpolated sample signal and the second bi-linearly interpolated sample signal to provide the first sample point voxel signal.

16. A method for generating a three-dimensional (3-D) volume projection image as defined in claim 1, wherein step (e) further comprises:
   performing at least one of back-to-front compositing, front-to-back compositing, first opaque projection, last opaque projection, maximum value projection, weighted sum projection, first-to-last cut projection and last-to-first cut projection of the interpolated voxel signals.

17. A method for generating a three-dimensional (3-D) volume projection image as defined by claim 1, wherein step (e) further comprises:
   a) identifying an interpolated voxel signal order for the plurality of interpolated voxel signal including a first interpolated voxel signal, a last interpolated voxel signal and corresponding interpolated voxel signals therebetween; and
   b) providing the first interpolated voxel signal to an arbitrary input port of a projection mechanism;
   c) providing the plurality of interpolated voxel signals to sequential ports of the projection mechanism in a wrap-around fashion.

18. A method for generating a three-dimensional (3-D) volume projection image as defined by claim 1, the method further comprising:
   transforming the pixel signal in accordance with the selected viewing parameters to provide a transformed pixel signal.

19. A method for generating a three-dimensional (3-D) volume projection image as defined by claim 1, the method further comprising:
   scanning one of an object or region and generating voxels in response thereto, the voxels being provided to a memory storage device for storage therein.

20. Apparatus for generating a three-dimensional (3-D) volume projection image, the apparatus comprising:
   a) at least two two-dimensional (2-D) memories, each of the at least two 2-D memories being capable of storing voxels provided thereto;
   b) an interpolation mechanism coupled to the at least two 2-D memories, the interpolation mechanism generating a plurality of continuous ray sample points along each of a plurality of continuous rays, the interpolation mechanism using a plurality of discrete rays defining a plurality of discrete ray planes to sample points, the plurality of discrete rays being defined by a plurality of voxels received from the at least two 2-D memories, the interpolated sample signals for a given continuous ray being generated in response to signals associated with the voxels of each of at least two of said discrete ray planes which are proximate to said given continuous ray, the interpolated sample signals for each continuous ray sample point of any given one of said plurality of continuous rays being determined in parallel; and
   (c) a projection mechanism coupled to the interpolation mechanism, the projection mechanism receiving the plurality of interpolated sample signals for each of the plurality of continuous rays, the projection mechanism generating a pixel value signal for each of the plurality of continuous rays, the pixel value signal corresponding to a pixel of the 3-D volume projection image.

21. Apparatus for generating a three-dimensional (3-D) volume projection image as defined by claim 20, the apparatus further comprising:
   a three-dimensional (3-D) memory having a plurality of memory modules capable of storing voxels therein, the 3-D memory being coupled to the at least two 2-D memories and providing voxels thereto.

22. Apparatus for generating a three-dimensional (3-D) volume projection image as defined by claim 21, wherein the 3-D memory has a skewed organization for storage of voxels, the skewed organization permitting the substantially simultaneous retrieval of a first plurality of voxels parallel to an axis of the 3-D memory, the first plurality of voxels representing a voxel beam.

23. Apparatus for generating a three-dimensional (3-D) volume projection image as defined to claim 21, the apparatus further comprising:

an interconnection mechanism coupled between the 3-D memory and the at least two 2-D memories, the interconnection mechanism receiving a plurality of voxels from the 3-D memory, the interconnection mechanism reorienting the plurality of voxels to provide an aligned discrete ray, the aligned discrete ray being provided to one of the at least two 2-D memories for storage therein.

24. Apparatus for generating a three-dimensional (3-D) volume projection image as defined by claim 20, wherein the interpolation mechanism comprises a tri-linear interpolation device (TRILIN) and the plurality of voxels received from the at least two 2-D memories define at least four of said discrete rays, the TRILIN utilizing at least two voxels from each of the at least four discrete rays to determine the interpolated sample value signal for each of the plurality of continuous ray sample points.

25. Apparatus for generating a three-dimensional (3-D) volume projection image as defined by claim 20, the projection mechanism further comprising:

a plurality of input ports for receiving the plurality of interpolated sample signals, the plurality of interpolated sample signals including a first sample signal, a last sample signal and corresponding sample signals therebetween defining a sample signal order, the first sample signal being provided to an arbitrary input port of the plurality of input ports of the projection mechanism, the plurality of interpolated sample signals being provided in a wrap-around fashion to the plurality of input ports.

26. Apparatus for generating a three-dimensional (3-D) volume projection image as defined by claim 25, the projection mechanism further comprising:

a voxel combination unit (VCU) having an input port and an output port, the input port of the VCU being coupled to at least three input ports of the projection mechanism, the VCU receiving at least two interpolated sample signals and providing a VCU output signal in response thereto.

27. Apparatus for generating a three-dimensional (3-D) volume projection image as defined by claim 25, the projection mechanism further comprising:

at least first, second and third voxel combination units (VCU), each of the at least first, second and third VCU having an input port and an output port, the input port of each of the VCU being coupled to at least three input ports of the projection mechanism, each VCU of the at least first, second and third plurality of VCU receiving at least two interpolated sample signals, the at least first, second and third VCU providing respective first, second and third intermediate value signals at corresponding output ports; and at least a fourth VCU having an input port and an output port, the input port of the at least fourth VCU being coupled to at least the three output ports of the first, second and third VCU, the fourth VCU receiving at least two of the first, second and third intermediate value signals and providing a pixel value signal at a corresponding output port in response thereto.

28. Apparatus for generating a three-dimensional (3-D) volume projection image as defined by claim 25, the projection mechanism further comprising:

a cascaded arrangement of at least first, second and third voxel combination stages, each of the first, second and third voxel combination stages including a voxel combination unit (VCU), the third voxel combination stage including fewer VCU than the second voxel combination stage, and the second voxel combination stage including fewer VCU than the first voxel combination stage.

29. Apparatus for generating a three-dimensional (3-D) volume projection image as defined by claim 20, the projection mechanism further comprising:

at least one of a front-to-back compositing mechanism, a first opaque projection mechanism, a last opaque projection mechanism, a maximum value projection mechanism, a weighted sum projection mechanism, a last-to-first cut projection mechanism and a first-to-last cut projection mechanism for generating the pixel value signal for each of the plurality of continuous rays.

30. Apparatus for generating a three-dimensional (3-D) volume projection image as defined by claim 20, the apparatus further comprising:

a shading mechanism, the shading mechanism utilizing a plurality of sample points along a plurality of continuous rays, the shading mechanism determining a gradient vector signal for each of the plurality of continuous ray sample points, the shading mechanism accessing and combining voxels proximate to each of the plurality of continuous ray sample points, the gradient vector signal being indicative of surface inclination proximate to each of the plurality of continuous ray sample points.

31. Apparatus for generating a three-dimensional (3-D) volume projection image as defined by claim 20, the apparatus further comprising:

a frame buffer coupled to the projection mechanism, the frame buffer receiving the plurality of pixel value signals from the projection mechanism and storing the pixel value signals therein.

32. Apparatus for generating a three-dimensional (3-D) volume projection image as defined by claim 31, the apparatus further comprising:

a pixel processing mechanism, the pixel processing mechanism being coupled to the frame buffer and receiving the plurality of pixel value signals, the pixel processing mechanism modifying each of the plurality of pixel signals and generating a plurality of pixel display signals.

33. Apparatus for generating a three-dimensional (3-D) volume projection image as defined by claim 32, the apparatus further comprising:

a display mechanism coupled to the pixel processing mechanism, the display mechanism having a plurality of pixels, the display mechanism receiving the plurality of the pixel display signals from the pixel processing mechanism, each of the plurality of pixel display signals corresponding to one of a plurality of pixels of the display mechanism, the display mechanism providing a 3-D volume projection image.

34. Apparatus for generating a three-dimensional (3-D) volume projection image as defined by claim 20, the apparatus further comprising:

a data acquisition mechanism, the data acquisition mechanism scanning one of an object or region and generating voxels in response thereto.

\* \* \* \* \*

UNITED STATES PATENT AND TRADEMARK OFFICE
CERTIFICATE OF CORRECTION

PATENT NO. : 5,594,842
DATED : January 14, 1997
INVENTOR(S) : Kaufman et al.

It is certified that error appears in the above-indentified patent and that said Letters Patent is hereby corrected as shown below:

Column 1, Line 3,     should read --<u>Statement of Government Rights</u>

This invention was made with Government support under contracts MIP-8805130 and CCR 9205047 awarded by the National Science Foundation. The Government has certain rights in the invention.--

Column 7, Line 21,     now reads "032", should read --031--; and

IN THE CLAIMS:

Column 16, Line 47,     now reads "ray planes to sample points", should read --ray planes to generate a plurality of interpolated sample signals, at least one signal for each of said sample points--.

Signed and Sealed this

Twelfth Day of August, 1997

Attest:

BRUCE LEHMAN

*Attesting Officer*        *Commissioner of Patents and Trademarks*